United States Patent [19]

Falvey et al.

[11] Patent Number: 5,465,288
[45] Date of Patent: Nov. 7, 1995

[54] POINT-OF-SALE SYSTEM FOR PROGRAMMING A CELLULAR TELEPHONE WITH ITS ASSIGNED TELEPHONE NUMBER

[75] Inventors: Neil J. Falvey; Edwin J. Day, III, both of Ballwin; Ricky L. Nappier; John T. Longtin, both of St. Louis, all of Mo.

[73] Assignee: The Cellular Hotline, Inc., Maryland Heights, Mo.

[21] Appl. No.: 70,087

[22] Filed: Jun. 1, 1993

[51] Int. Cl.[6] ................................................. H04M 11/00
[52] U.S. Cl. .............................. 379/58; 379/59; 379/441
[58] Field of Search .............................. 379/58, 59, 63, 379/441; 455/89, 90, 68, 186

[56] References Cited

U.S. PATENT DOCUMENTS

| | | | |
|---|---|---|---|
| 4,718,080 | 1/1988 | Serrano et al. | 379/59 |
| 4,864,599 | 9/1989 | Saegusa et al. | 379/61 |
| 4,951,308 | 8/1990 | Bishop et al. | 379/91 |
| 4,958,368 | 9/1990 | Parker | 379/91 |
| 4,965,821 | 10/1990 | Bishop et al. | 379/91 |
| 4,977,592 | 12/1990 | Hollowed et al. | 379/428 |
| 5,109,403 | 4/1992 | Sutphin | 379/59 |
| 5,155,860 | 10/1992 | McClure | 455/89 |
| 5,297,191 | 3/1994 | Gerszberg | 379/59 |
| 5,297,192 | 3/1994 | Gerszberg | 379/59 |
| 5,315,638 | 5/1994 | Mukari | 379/58 |
| 5,333,177 | 7/1994 | Braitberg et al. | 379/58 |

*Primary Examiner*—Curtis Kuntz
*Assistant Examiner*—Michael B. Chernoff
*Attorney, Agent, or Firm*—Senniger, Powers, Leavitt & Roedel

[57] ABSTRACT

A point-of-sale programming system for a selected one of a plurality of types and models of cellular telephone. A point-of-sale computer has an I/O port generating command and data information corresponding to the specific set of command signals and data signals required for the selected telephone to be programmed and for reading the preassigned serial number of the telephone. An interface converts the information into the specific set of command and data signals required for the selected telephone to be programmed. The interface has a telephone interface port through which the specific set of command signals and data signals are provided. The interface reads the preassigned serial number via the telephone interface port. An RS232 cable connects the I/O port of the computer and the interface. A passive cable with an RJ45 connector connects the telephone interface port of the interface and the programming port of the selected cellular telephone. The point-of-sale computer provides the system computer via modem with the preassigned serial number of the selected cellular telephone being programmed thereby permitting the system computer to verify that the selected telephone can access the CT system.

34 Claims, 10 Drawing Sheets

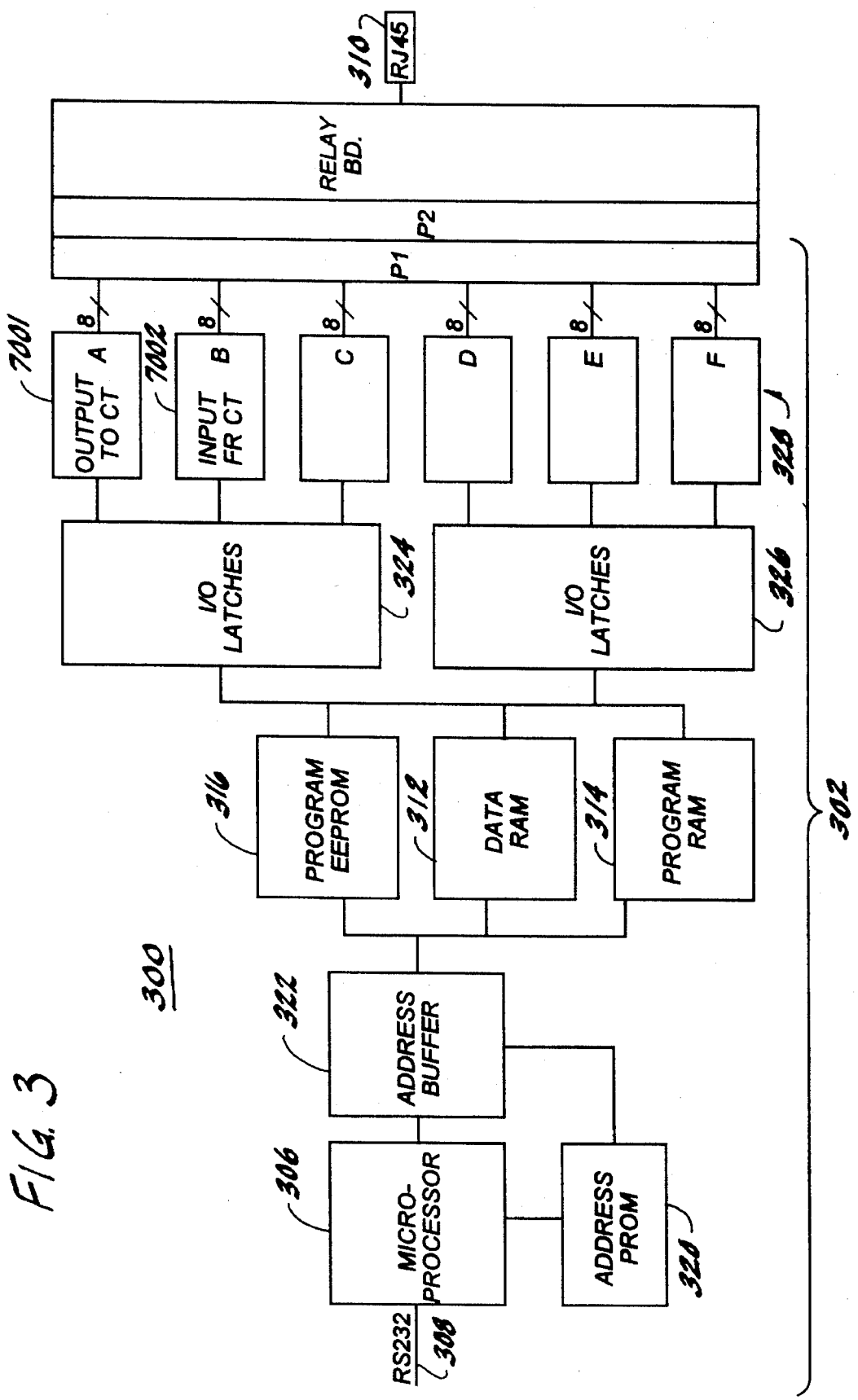

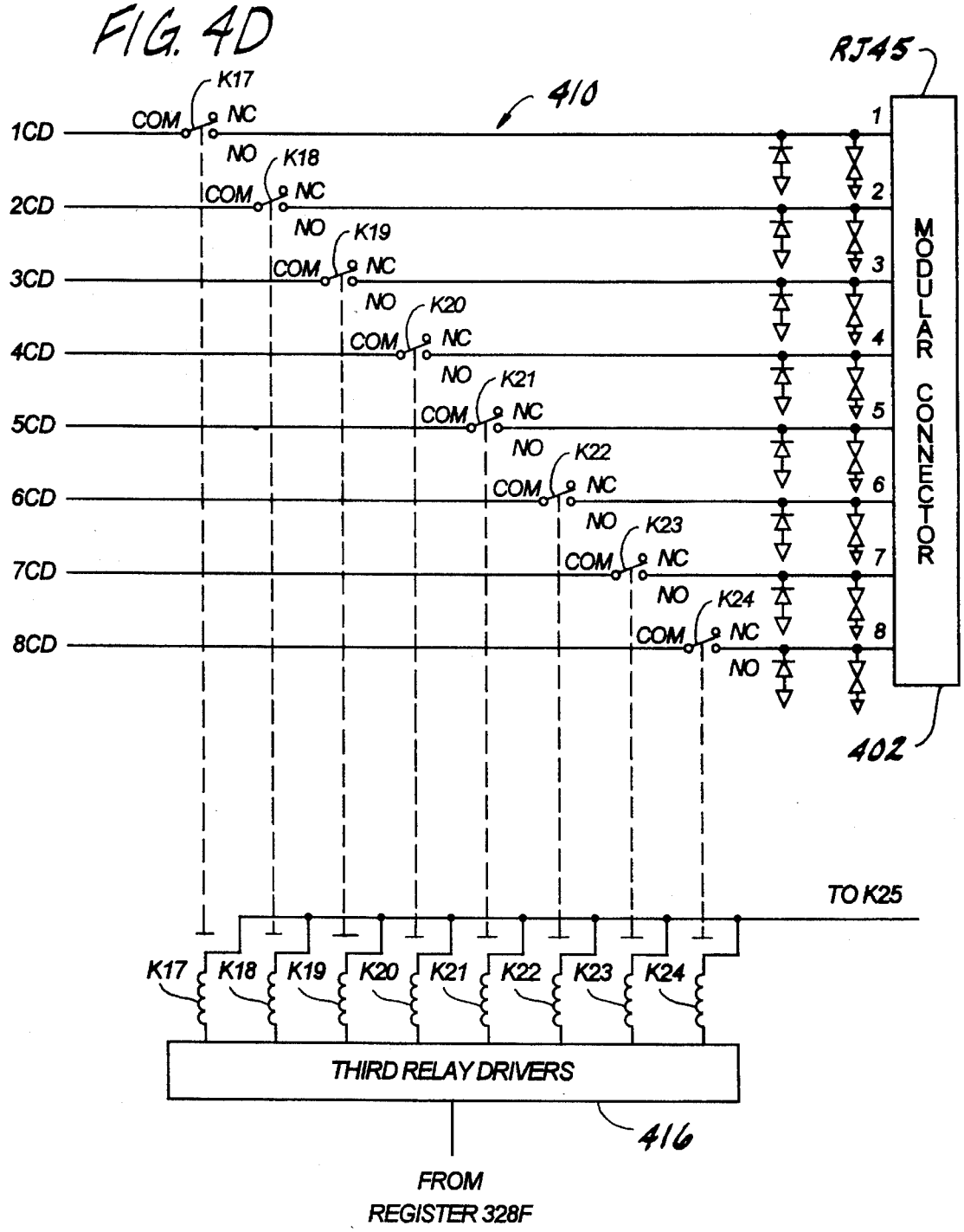

POINT-OF-SALE SYSTEM FOR PROGRAMMING A CELLULAR TELEPHONE WITH ITS ASSIGNED TELEPHONE NUMBER

BACKGROUND OF THE INVENTION

Cellular communication has experienced explosive growth during the past five years and is expected to continue growing rapidly. Cellular telephones are no longer considered a luxury but are a vital part of everyday communication. As a result, this creates a need to sell and maintain cellular equipment and services through new distribution channels while expanding existing channels. There is a need for point-of-sale systems which make it possible to market communication products and services to consumers in mass market locations while they are shopping and when they are ready to buy.

SUMMARY OF THE INVENTION

It is an object of this invention to provide a point-of-sale system for cellular telephones which encourages increased number of new subscribers and which provides higher new subscriber satisfaction. It is another object of this invention to provide a point-of-sale cellular telephone system which encourages increased sales of more profitable products and services and increased control over information reaching the consumer. It is yet another object of this invention to provide a point-of-sale cellular telephone system which has increased control of information reaching the consumer, reduces service activation time, reduces paperwork, reduces errors in training costs, reduces the impact of retail staff turnover, reduces fraud, and provides a consistent message to consumers.

The invention comprises an interface for programming a selected one of a plurality of types and models of devices such as a cellular telephone. Each device requires a specific set of command signals and data signals for programming the device for operation. In the case of a cellular telephone, the telephone is programmed for operation as part of a cellular telephone system. Each device has a programming port through which data may be transferred by data signals and through which the device may be controlled by command signals. The interface is for use with a system comprising a computer having an I/O port and including a database storing sets of command and data information, each set for programming a particular one of the plurality of devices. The computer also includes means for identifying the particular set of command and data information in the database required for programming the selected device and interface driver software for sending information via the I/O port corresponding to the particular set of command and data information. The interface comprises means connected to the I/O port and having a device interface port for sending via the device interface port the specific set of command signals and data signals corresponding to the information provided by the computer via the I/O port. The interface also comprises means providing the specific set of command signals and data signals to the programming port of the selected device via the device interface port thereby providing the specific set of command signals and data signals via the programming port to the selected device for programming it.

The invention also comprises an interface for a system for programming a selected one of a plurality of types and models of cellular telephones. Each telephone requires a specific set of command signals and data signals for programming the telephone for operation as part of a cellular telephone system. Each telephone has a programming port through which data may be transferred by data signals and through which the telephone may be controlled by command signals. The system includes a computer having an I/O port sending command and data information corresponding to the specific set of command signals and data signals required for the selected telephone to be programmed. The interface comprises means converting the information into the specific set of command signals and data signals required for the selected device to be programmed. The interface has a device interface port through which the specific set of command signals and data signals are provided. The interface also comprises means connecting the I/O port of the computer and the interface thereby providing the information to the interface, and means connecting the device interface port of the interface and the programming port of the selected device thereby providing the specific set of command signals and data signals via the programming port to the selected device for programming it.

The invention also comprises an interface for a system for programming a selected one of a plurality of types and models of devices such as cellular telephones, each device requiring a specific set of command signals and data signals for programming the device for operation as part of a device system. Each device has a battery compartment including a power input port for engaging a battery within the compartment for supplying electrical power to the device. Each device also has a programming port in the compartment through which the device may be programmed. The system has computer means for sending information corresponding to the specific set of command signals and data signals for the selected device to be programmed. The interface comprises means, connected to the computer means and having a device interface port, converting the information provided by the computer means into the specific set of command signals and data signals required for the selected device to be programmed. The converting means provides the specific set of command signals and data signals via the device interface port. The converting means includes a power output port for supplying power for the selected device to be programmed. The interface also comprises adapter means engaging the battery compartment for connecting the device interface port of the converting means to the programming port of the selected device to supply the specific set of command signals and data signals to the selected device to program it. The adapter means also connects the power output port of the converting means to the power input port to supply power to the selected device to power it during programming.

The invention also comprises methods of operation of the interface and systems including the interface and their methods of operation.

Other objects and features will be in part apparent and in part pointed out hereinafter.

BRIEF DESCRIPTION OF THE DRAWINGS

FIG. 3 is a block diagram of the logic board of the cellular telephone interface according to the invention.

FIGS. 4A, 4B, 4C and 4D are a partial schematic diagram of the switched relays of the relay board of the cellular telephone interface according to the invention.

Corresponding reference characters indicate corresponding parts throughout the drawings.

DETAILED DESCRIPTION OF THE PREFERRED EMBODIMENTS

Figure 1:
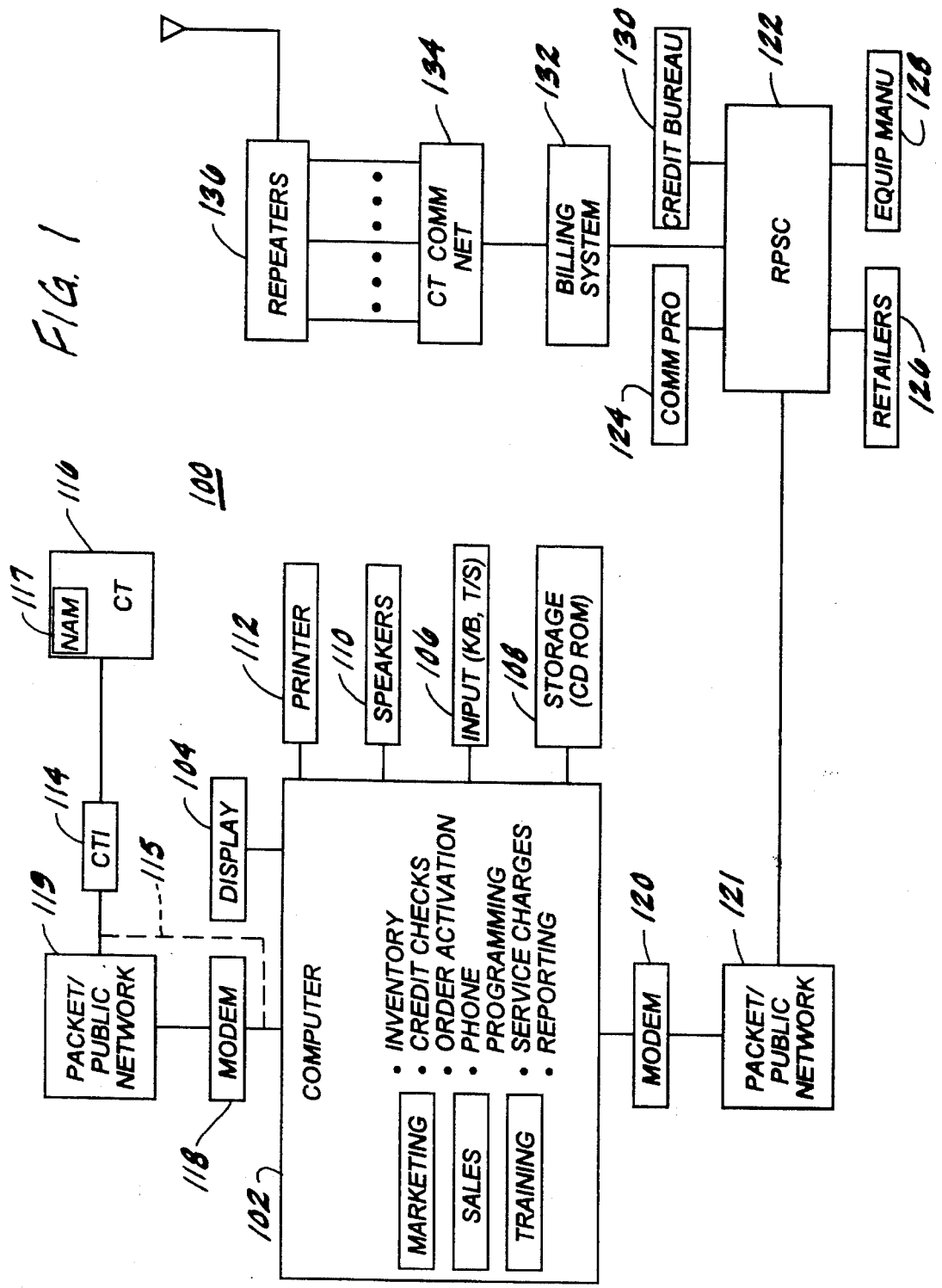
FIG. 1 is a block diagram of a cellular telephone system including a retail processing service center (RPSC) and a point-of-sale (POS) computer system according to the invention.

As shown in the FIG. 1, a cellular telephone system 100 according to the invention includes a point of sale computer 102 that provides marketing, sales, and training components. In particular, it is contemplated that POS computer 102 may provide inventory maintenance, credit checks, order activation, phone programming, service charges, and reporting.

The marketing component employs a display 104 which incorporates video presentations of service and equipment offerings available at the retail location. It is contemplated that display 104 may be a high resolution computer graphics monitor responsive to an input 106 such as a touch-sensitive (T/S) screen or a keyboard (K/B) which encourage and enhance customer participation. The video presentation may be in the form of a multi-media display of various types of information held in a storage 108 such as a CD ROM and may include an audio presentation via speakers 110 as well as various printed information provided by a printer 112. Phone programming is provided via a cellular telephone interface (CTI) 114 for programming via line 115 a selected one of a plurality of types and models of cellular telephones 116, each telephone requiring a specific set of command signals and data signals for programming the telephone for operation as part of cellular telephone system 100. Interface 114 will be described in greater detail below. Although computer 102 is illustrated as being located at the point of sale, it is contemplated that computer 102 may be remotely located with respect to the point of sale of cellular telephone 116. When remotely located, computer 102 may be linked to interface 114, which would be located at the point of sale, by a modem 118 and a packet/public network 119. When computer 102 and interface 114 are at the same location, e.g., the point of sale, interface 114 may be directly linked to computer by line 115, such as by a hard wire cable connection.

Point-of-sale computer 102 is electronically linked such as via a modem 120 and a packet/public network 121 to a retail processing service center (RPSC) 122 which acts as a focal point for all transactions among communication providers 124, retailers 126, equipment manufacturers 128, and credit bureaus 130. The RPSC 122 interfaces with a billing system 132 for a real-time activation of cellular telephone 116 so that it may operate as part of cellular telephone communication network (COMMNET) system 134 by accessing one or more repeaters 136 thereof. The RPSC 122 may also distribute updates to remote administration and marketing components on a periodic basis. Alternatively, computer 102 and RPSC 122 may be a single computer, such as when computer 102 is remotely located, in which case modem 120 and network 121 are not needed.

From an administration perspective, the point-of-sale computer system 102 performs primary communications provider needs as follows: automated programming of cellular telephones 116; records subscriber data entry via input 106; real-time credit checks via the link by modem 118 and network 120 with RPSC 122; interfacing with the service provider's CT COMMNET 134 to activate new subscribers; manages local inventory via computer 102; and reports activities daily, weekly, monthly or on demand such as by print-out via printer 112.

From a marketing standpoint, the point-of-sale system 102 fulfills the primary communications provider's needs as follows: educates consumers about cellular services by a multi-media presentation employing display 104, input 106 such as a touch screen, storage 108, speakers 110 and printer 112; introduces prospective customers to all services offered via the same multi-media display; provides product information, comparisons, and pricing, noting which products are in stock via the same multi-media display; gathers initial subscriber data, including name, address, telephone, and credit card numbers, for lead tracking and additional targeted marketing activities via input 106 and link by modem 118 and network 120 to RPSC 122; and generates and maintains a prospective subscriber database via input 106 and link to RPSC 122.

From a training perspective, the point-of-sale computer system 102 fulfills the primary communications provider needs as follows: provides computer based training to retailer/dealer personnel on the technology and terminology associated with service offerings via the multi-media display; encourages on-going sales personnel training via incentives via the reporting abilities of the system; and provides training that meets retailer/dealer schedules and proficiency needs via the multi-media display.

Remote programming of cellular telephone 116 is a process that employs a desk top computer 102 to compose and inject command and data information necessary to properly use the instrument rather than entering the information by hand. Presently, cellular telephones are programmed by manually keying the programming information into the telephone via the keypad of the telephone. Remote programming improves the reliability of the programming process with the corresponding increase in customer satisfaction, as well as an overall reduction in time and costs. These costs savings are accomplished by shipping product directly from source to retail outlet, reducing training costs of retail sales personnel and reducing the return/reservice rate. The operator enters customer data via input 106 into the computer 102 at the time of the sale. This data may include name, address, telephone number, cellular area, and other information. Some of this data must be recorded in the cellular telephone. Each telephone has a transmit-receive unit including an electronic memory called a number assignment module (NAM) 117 in which data is recorded in coded form. The coded form for each type or model of cellular telephone varies according to the manufacturer. The content of the data and its order of recordation and storage within the NAM varies among manufacturers. Using the cellular telephone system 100 according to the invention, the POS computer 102 performs all the encoding and recording for any cellular telephone 116 which has properties that are stored in the data-base of the computer 102.

Figure 2:
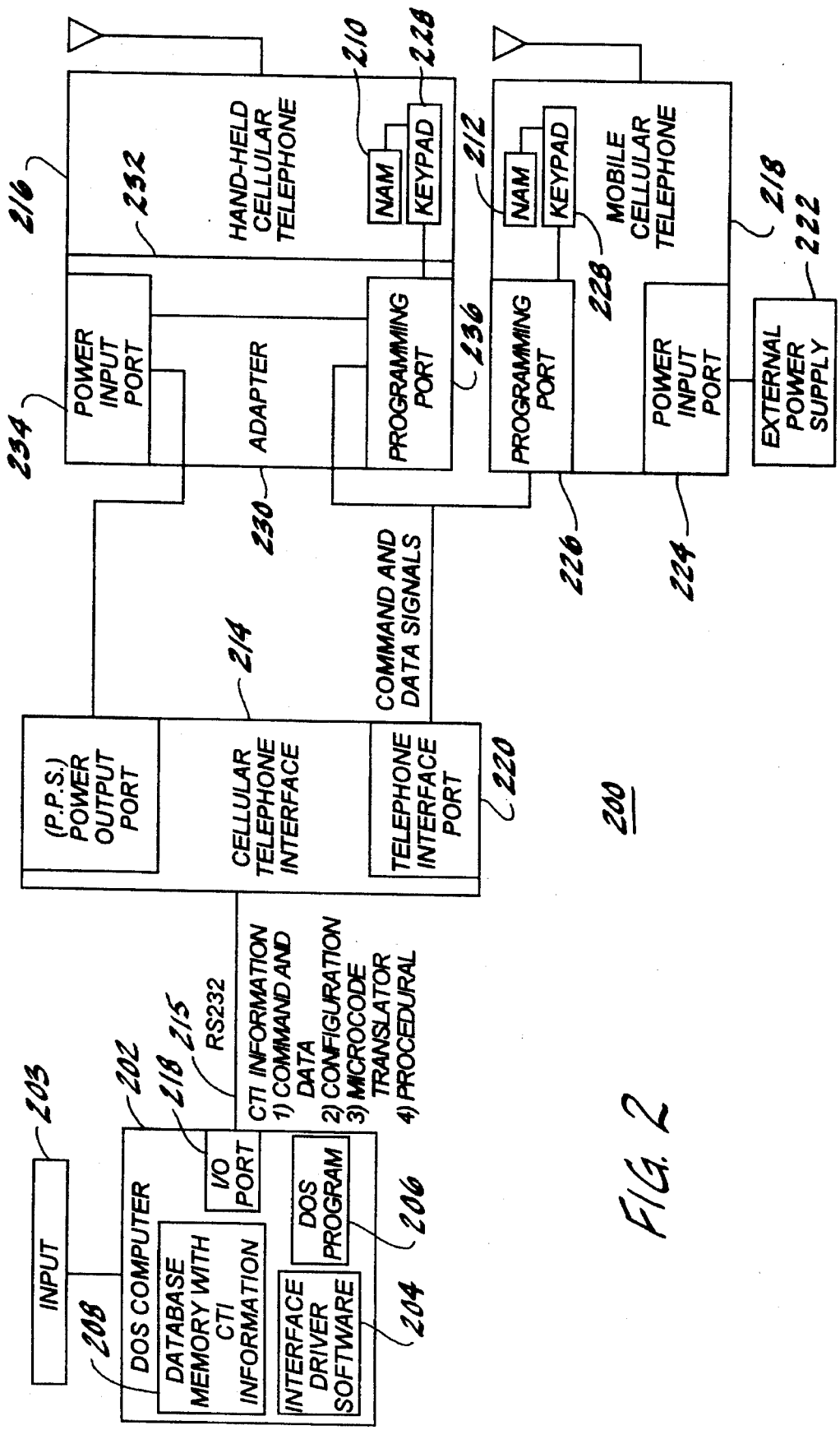
FIG. 2 is a block diagram of the POS computer and cellular telephone interface in combination with both hand-held and mobile cellular telephones.

FIG. 2 is a block diagram of one preferred embodiment of a remote programming portion of a point-of-sale CT computer system 220 according to the invention. In general, an operator employs a POS computer 202 via an input 203 to enter the make, model, phone number, location, and other variables for use by the rest of the CT system. Much of this data is normally obtained from the customer. Computer 202 includes an interface driver software 204 which, upon receiving a call from an operator via a POS program 206, selects the description of the cellular telephone from the database 208 and initiates a sequence of transactions that will encode the required command and data variables into a NAM 210, 212 of the particular cellular telephone to be programmed.

A cellular telephone interface 214 is a digital device that is capable of two-way communication between the point-of-sale computer 202 and the cellular telephone to be programmed. FIG. 2 illustrates interface 214 connected to two telephones, a hand-held cellular telephone 216, and a mobile cellular telephone 218. In fact, only one telephone at a time would be connected to the interface 214. FIG. 2 illustrates connections to both hand-held and mobile telephones to illustrate the similarities and differences therebetween. These aspects will be described in greater detail below. Interface 214 generally consists of an embedded microprocessor, memory, interface chips, relays, and a family of programs as will be described in greater detail below. Interface 214 is linked to POS computer 202 via an RS232 link 215 which 5s essentially a passive cable for carrying serial information between an RS232I/O port 218 of computer 202 and the microprocessor of interface 214. The computer 20L and the CTI 214 need not be located in the same room or even in the same geographical region. The computer's ability to condition the CTI to any telephone and send the command and data signals via readily available RS232 ports mean the CTI 214 can be directed by a computer located thousands of miles away.

This system 200 is designed to program a selected one of a plurality of types and/or models of cellular telephones. Database 208 contains all of the CTI information required by the CTI 214 and needed to condition the cellular telephone interface 214 to transfer data between the phone and computer 202. In general, each telephone must be programmed for operation as part of the cellular telephone system. In particular, each telephone requires a specific set of command signals and a specific set of data signals both delivered at a specific voltage and at a specific rate. Normally, the telephone is programmed through a keypad 228 of the handset by a human operator who enters a rather long set of keystrokes, each producing a signal that is sent to a transmit-receive unit (TRU) including NAM 210 of the telephone. Each set of signals, handset and TRU are unique to each type and model of cellular telephone and are different from each other.

The interface 214 mimics the physical properties required for programming any handset, including but not limited to, voltage (both signal and power), impedance, pin assignments (both signal and power) and "pullup" resistances (if any). The interface 214 also is able to transform commands sent from the POS computer 202 into the specific set of bits at the required bit transfer rate and the required intercommand rate. Any coding needed to identify the command as a command, rather than data, can be generated by the CTI 214. Further, any coding or signals needed to identify the handset as the expected handset are sent to the phone by the CTI 214. The interface 214 is not limited to the above-mentioned features but is capable of accommodating other variables that may occur in the command signals.

The interface 214 also transforms the data signals needed to program the phone into the proper values, proper coding, proper format, correct voltages, expected rates and accounts for the necessary delays and the required contexts. The interface 214 is not limited to the above-mentioned parameters but is capable of sending any signals that may be required by the TRU.

The interface 214 reads variables from the cellular telephone including variables that cannot be changed except by the manufacturer of the telephone. As above, the interface 214 accounts for variations in values, coding, format, voltages, rates and accounts for the necessary delays and the required contexts. The variability is accomplished by using highly structured microcode that is retained on the database 208 and loaded into the CTI 214 when a particular make and model of phone is identified. The microcode is loaded into the CTI 214 using the same data channel as the command and data information, thus no action is required by the human operator to condition the system to a particular make or model cellular phone.

Database 208 includes: (1) a preassembled collection of information corresponding to the command and data signals necessary for such programming for each and every telephone that could be programmed by the system; (2) configuration information which configures the CTI 214 by defining its protocols, timing, pin assignments, and voltage levels; (3) microcode translator information which translates the command and data information; and (4) procedural information which implements the translated command and data information according to the configuration information to create the command and data signals provided to the cellular telephones. Of course, database 208 may be remote from POS computer 208 and accessed by a network or modem (not shown).

Via input 203, an operator instructs computer 202 to perform certain operations on the particular cellular telephone to be programmed or on the telephone interface 214. Table 1 illustrates the operations which are performed.

TABLE 1

INTERFACE DRIVER SOFTWARE OPERATIONs

1 - Reset the cellular telephone interface (CTI).
2 - Load "permanent" sub-routines in the CTI.
3 - Configure the CTI for the selected make/model to be programmed.
4 - Turn the cellular telephone on or off.
5 - Read serial number in NAM of cellular telephone.
6 - Record a parameter in the NAM.
7 - Read a recorded parameter from the NAM.

When the POS program 206 communicates to the interface driver software 204, it does so using a "call" or command followed by a set of parameters or data. The parameter list always starts with the command operation. The remaining data is sent via a single string. Essentially, the calls and parameters for the makes and models of telephone to be programmed are stored in data-base memory 208 as command and data information. The form, contents and meaning of the parameter vector is:

ppllccc . . . ccc where:
pp is the operation code in hexidecimal; 11 is the number of characters (or length of string) which will be sent to the phone (in hex); ccc . . . ccc is the variable length character string to be transmitted to the phone (in hex). It must exactly equal the length specified in the second parameter (in ASCII form).

The data supplied to the interface driver software 204 by the POS program 206 is always supplied in ASCII form according to the above parameter vector. The interface driver software 204 performs all of the input/output (I/O) operations between the POS computer 202 and the cellular telephone interface 214.

There are two main tasks that the interface driver software 204 performs: (1) loading the configuration, translator and procedural microcode that conditions and configures the CTI 214 to program a specific phone, and (2) programming of the specific phone by command and data signals generated in response to command and data information. The microcode that enables the CTI to program a plurality of phones is read from database 208 in INTEL standard form. The microcode is sent to the interface and stored in external program memory. Since the form of the command and data information includes memory addresses, the software 204 simply passes the records through the interface 214 to the phone 216, 218.

I/O operations are performed at a fixed rate and protocol such as 9,600 baud, 8 bits, no parity, 1 stop bit. The I/O routines are all functions which are generic to the operating system. No communication libraries or commercial routines are used. The I/O operations needed are all elementary and are checked by other parts of the remote programming system. Reliability is assured not by redundant transmissions, verification, or other techniques, but by referencing (reading) each of the NAM variables after loading in the same way that the variables are used in normal operations. This technique ensures high reliability even though only elementary I/O operations are employed.

Referring to Table 1, first the interface 214 is reset by turning off all relays, disconnecting all ports and performing a machine reset of the microprocessor thereof. Next, permanent sub-routines are loaded into the memory of the interface 214. This includes the loading of a program loader and a program which sets the properties of the interface such as voltage, data rate, and delay times followed again by a reset thereof. At step 3, the particular physical configuration of the interface in order to program a selected make/model of cellular telephone is implemented. The identifications of the microcode sub-routines that perform that I/O operation between the interface and the particular telephone are fetched from the database 208 of computer 202. The property vector and the sub-routines are in the same format. This data is transmitted to the interface from the computer 202 and deposited in the interface data memory.

Figure 2A:
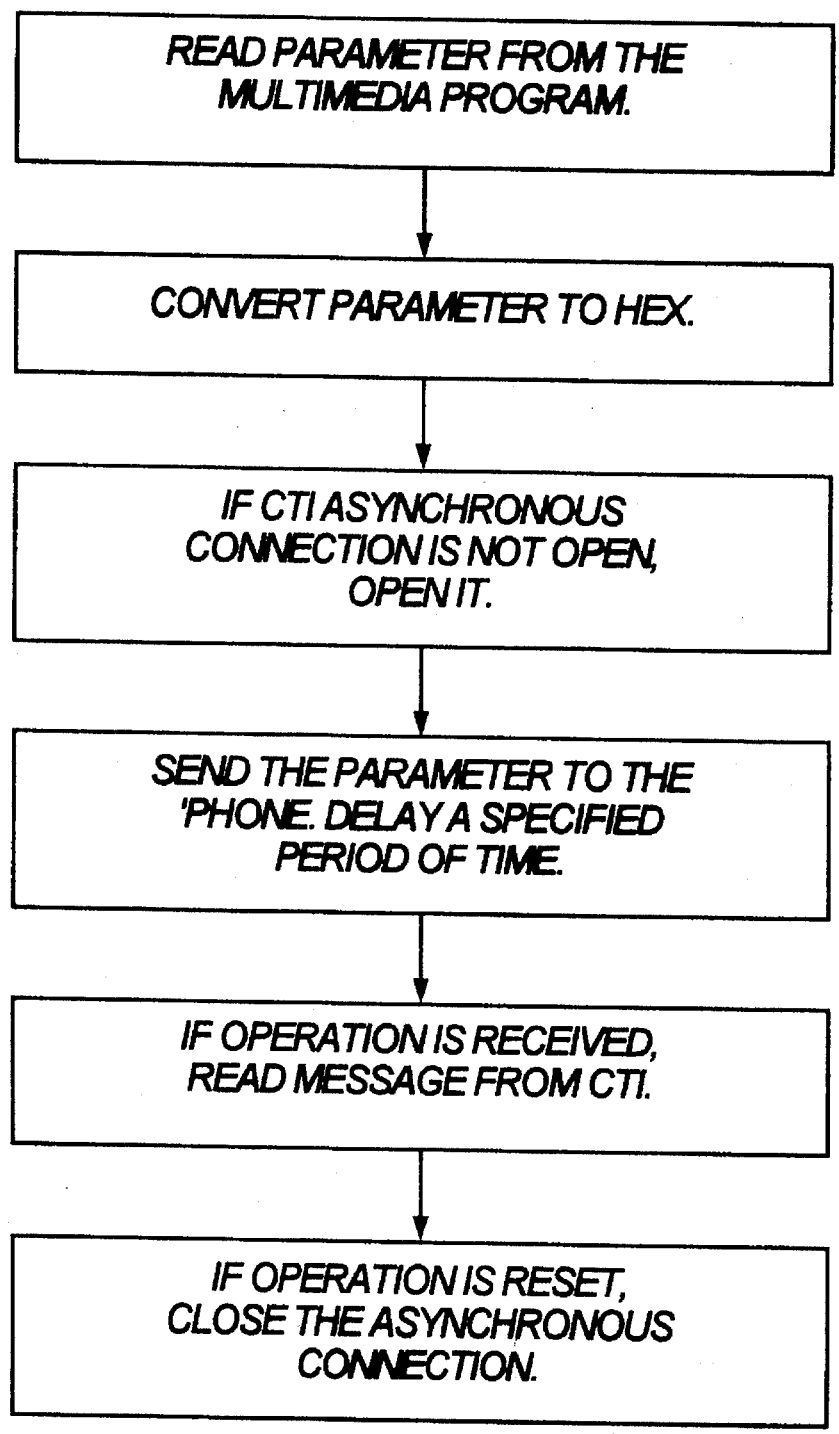
FIG. 2A is a flow diagram of the interface driver software operation.

At step 4, the phone is turned on or off, as needed. At step 5, the serial number stored in the NAM of the selected cellular telephone is read. The command sequence to put the selected telephone into a test or diagnostic mode is sent to the phone followed by the command to read the serial number. When the serial number has been read, the phone is returned to its normal state via another command sequence. The serial number is placed in the parameter string and control is returned to the POS program 206. At step 6, parameter data is recorded in the NAM 210, 212. The data is sent from the interface driver software 204 via the interface 214 followed by a command to execute the current programs in the interface program memory. The parameter data will be recorded in the phone's NAM by the program set in the interface program memory modified by the parameter set recorded in the interface data memory. At step 7, the parameter data is read from the NAM to verify it. In particular, the contents of the NAM are read for the express purpose of checking the parameters recorded therein against what should have been recorded. This function is the error checking function and reads each NAM variable and checks it against the values sent. If a discrepancy is found, it is reported to the POS program 206. This type of error checking, where the encoded date is read after the recording has been completed, is a type of checking closest to actual operating conditions that are possible in the sale environment. A flow diagram of the driver software 204 is illustrated in FIG. 2A.

Two properties of the CTI 114 have an impact on the programs that transfer data between the computer 202 and the CTI 114. First, characters needed to program a specific phone may be any of the 256 possible eight bit characters. A conflict emerges when certain characters are required to program a phone that also has special meaning in the telecommunications milieu. This is because the computer 202 to CTI 214 communication is performed using INTEL microcode and Microsoft communications software. In order to eliminate any control functions from the computer 202 to CTI 214 messages, all communications between these two components is performed in hexadecimal. The first two parameters have numeric values, the third is an ASCII string. The conversion from decimal the hexadecimal and the conversion from ASCII to hexadecimal are done by the interface driver software 204. The program in the CTI 214 reverses the conversion. Second, no more than 78 characters can be sent or received by the CTI 214. Parameters having more than 78 characters must be passed in two or more blocks. Operation three, noted below, will be used to signify the beginning of the block when additional blocks will follow. The actual operation of the entire parameter will be taken from the final block. Formally, a parameter may consist of one or more blocks, the operation of the parameter is the operation code in the final block. The operation code in all preceding blocks (if any) will be 03. When receiving date from the CTI, it must be sent in 78 character blocks. The last block indication is the CTI ready prompt ">".

When sending the microcode that conditions the CTI to a particular phone among the plurality of phones programmed, the operations are very straightforward; open the asynchronous port, send all of the INTEL records, close the asynchronous port. Complexity of this level needs no additional explanation.

The following discussion applies to the parts of the software 204 that translate parameters into phone specific code and record said code in the NAM. The operations are:

00 Transmit

01 Transmit and receive

03 More to come

07 Turn the phone on or off (Momentary ground)

08 Transfer phone parameters from program memory to date memory

09 Reset the CTI

1. Operation 00. Transmit a parameter to the phone. The date is sent from the CTID (in the PC) to the CTI followed by a command to execute the current programs in the CTI program memory. The parameter normally will be recorded in the phone's NAM by the program set in the CTI's program memory modified by the parameter set recorded in the CTI's data memory.

2. Operation 01. Transmit and read a parameter from the NAM. This operation differs from the operation above only in that a parameter is read after the transmission. Normally, this operation is used to check the contents of the NAM.

3. Operation 03. More to come indicates that the message is incomplete and will be followed by another 03 or the last of the set of messages which must be either operation 00 or operation 01.

4. Operation 07. Toggle power on or off the phone.

5. Operation 08. Condition the CTI to make/model. The parameters and subroutines that condition the I/O between the CTI and control the data flow to and from the phone are deposited in program memory of the CTI. The properties vector and the subroutines are in the same format.

6. Operation 09. Reset the CTI. Disconnect all ports including any power forms provided through the RJ45 modular connector. This operation will initiate a sequence of program code that prevents the CTI internal machine reset from activating.

7. Operation 10. Load permanent subroutines. Load the program loader (LOD030) and the main program for remotely programming the phone.

The connection between the computer 202 and interface 214 is preferably a short, less than ten feet, nine pin, RS232 cable. Preferably, it will operate at 9600 baud, one start bit, eight data bits, one parity bit, and two stop bits with EAI conversions applicable. Preferably, this cable is strictly a passive device. RS232 cable 216 interconnects the I/O port 218 of computer 202 to inputs/outputs of the microprocessor of cellular telephone interface 214. Command and data signals are provided to the selected cellular telephone by a telephone interface port 220 of the interface 214. Mobile telephones 218 normally get their power from a 12 volt system in an automobile. When automobile units are sold, power will be provided via the external power supply 222 to permit programming. When programming mobile cellular telephone 218, an external power supply 222 is connected to the power input port 224 of the mobile cellular telephone 218 to provide power thereto. A programming port 226 of the mobile cellular telephone is connected via a passive cable to the telephone interface port 220. Preferably, such a cable would have an eight pin RJ45 connector for engaging mobile phone 218. Programming port 226 is a standard port provided on each mobile cellular telephone which allows access to the electronics of the telephone without employing the number key pad 228 of the telephone. In other words, programming port 226 accesses NAM 212 without the need for keypad 228.

On the other hand, hand-held cellular telephones 216 normally obtain power from an internal battery pack. When hand-held units are programmed, power will be supplied by the interface 214. Such power will be 12, 9, or 6 volts at 600 milliamps. An adapter 230 is required for all hand-held phones. The adapter will be plugged into the phone in place of the battery pack. Each hand-held telephone 218 has a battery compartment 232 including a power input port 234 for engaging the battery within the compartment for supplying electrical power to the telephone. In addition, each telephone 216 has a programming port 236 in the battery compartment 232 through which the telephone may be programmed. The interface 214 is connected to either phone through an eight-wire cable using a standard modular connection such as an RJ45. Pin assignments vary among manufacturers and even among models. The interface 214 assigns pin function via software using a system of programmable relays as will be discussed in greater detail below.

Referring to FIG. 3, a block diagram of one preferred embodiment of a cellular telephone interface 300 according to the invention is illustrated. The interface 300 includes a logic board 302 and a relay board 304 joined by a 52 pin connector P1/P2. Logic board 302 may be any typical logic board such as a standard Robitech board number 9074. The logic board includes an embedded microprocessor 306 along with various memory and interface chips. Interface 200 provides two-way communication between the POS computer via RS232 cable 308 and a cellular telephone via RJ45 connector 310. The purpose of interface 300 is to provide a link between the relatively limited communications capability of a personnel computer such as POS computer 202 having only an RS232 I/O port and the wide varieties of variations in voltage, speed, protocol, and content encountered when programming a diverse variety of cellular telephones.

Microprocessor 306 may be any embedded type of microprocessor. In the case of the Robitech logic board 302, the microprocessor is preferably an Intel 8052 which is essentially a computer with several built in timing circuits and a built in communications system. The hardware includes an external data random access memory (RAM) 312, a program random access memory (RAM) 314, a program electronically erasable, programmable, read only memory (EEPROM) 316. There are also peripheral devices such as an address PROM 320 and address buffers 322 along with I/O latches 324, 326, and registers 328 that facilitate the flow of signals into and out of the ports of microprocessor 306. The data paths are preferably conditioned through the use of pull-ups and series of resistors and protected from damage through the use of diodes and varistors. These circuits afford a measure of protection to both the interface and the telephone.

The CTI is designed to be driven only by the PC. The operator is never expected to touch it. This is especially important when working in the Windows environment because Windows is a non-preemptive multiprogramming system. That is, it is incapable of time slicing and cannot take control unless the program in operation surrenders it. Thus, the classic technique of an interrupt driven timeout procedure is too advanced for the environment. Instead, a timeout hardware in the form of a single shot is used to reset the CTI.

Preferably, five functions are implemented by the interface 300 using a combination of hardware, software, and firmware. These functions are:

1. Send and receive ASCII data from the POS computer in RS232 protocol;

2. Supply power to the hand-held telephones via the adapter;

3. Assign RJ45 pins to their particular function as required by the selected telephone to be programmed;

4. Send and receive data to/from the telephone at TTL voltages and impedances; and 5. Transform the data sent/received to/from the arbitrary protocols employed by the cellular telephone.

Appendix A, attached hereto and incorporated in its entirety herein, is a description of the microcode programs which are loaded into microprocessor 306 of the cellular telephone interface (CTI) by the POS computer.

Figure 4:
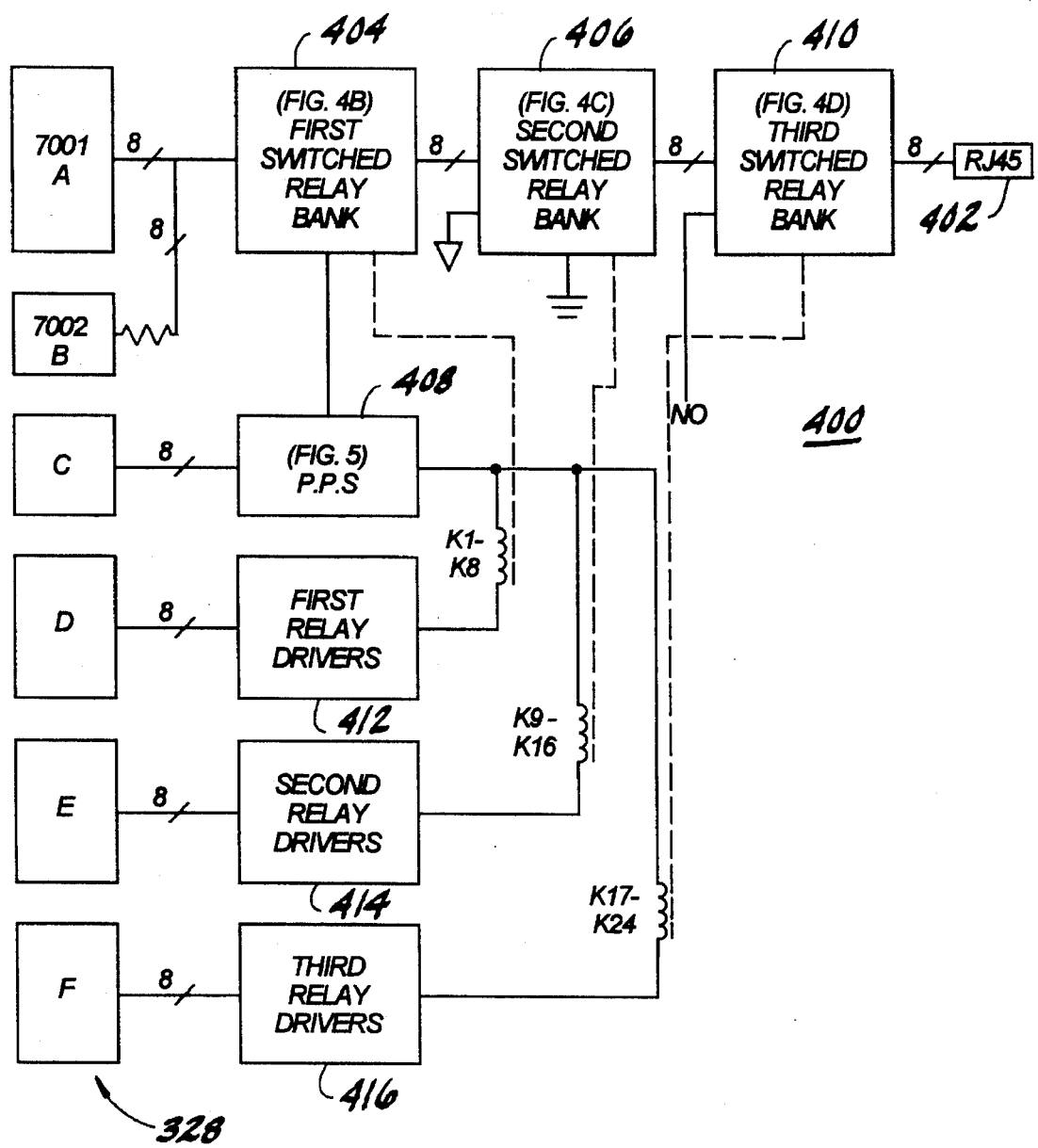
FIG. 4 is a block diagram of the relay board of a cellular telephone interface according to the invention.

FIG. 4 illustrates a relay board 400 according to one preferred embodiment of the invention. A primary purpose of the relay board 400 is to assign a functional path to a pin on the RJ45 connector 402 using software so that when the RJ45 connector 402 is connected to the selected telephone to be programmed, the proper information is provided to the appropriate pin of the selected telephone. In general, there are seven functions that a cellular telephone manufacture normally assigns to one of the pins on the RJ45 connector 1—ground.

2—power.

3—on/off.

4—data in.

5—data out.
6—audio in.
7—audio out.

When designing a remote programming system, the audio functions are usually ignored. The remaining five functions vary in pin assignment among manufacturers. Furthermore, the two data functions may be assigned one pin each, one pin for both or more than one pin each. Finally, the various power supply voltages required by the hand-held phones vary and are developed as needed by the on-board programmable voltage regulator that will be described in greater detail below.

Figure 4A:
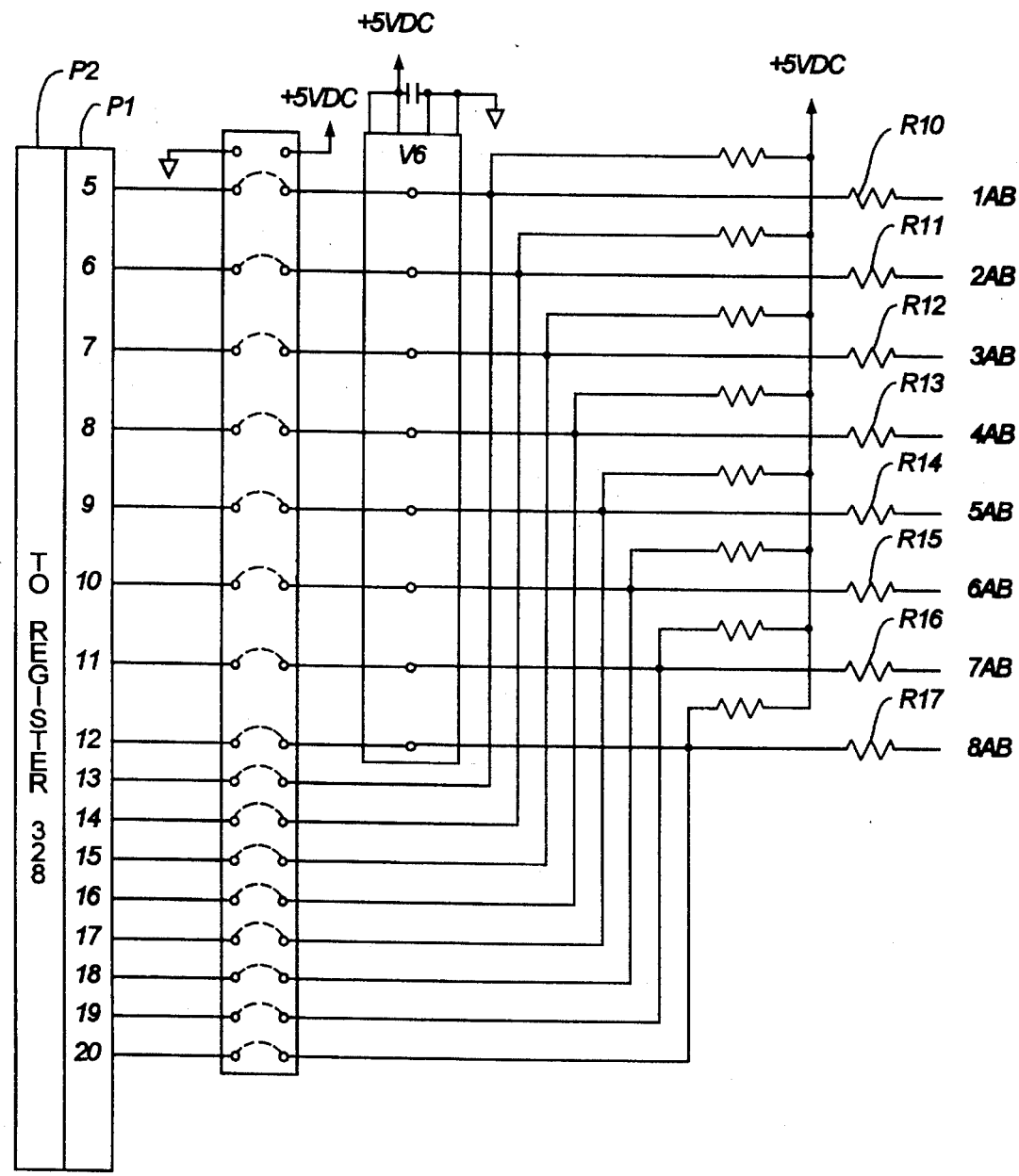
Figure 4B:
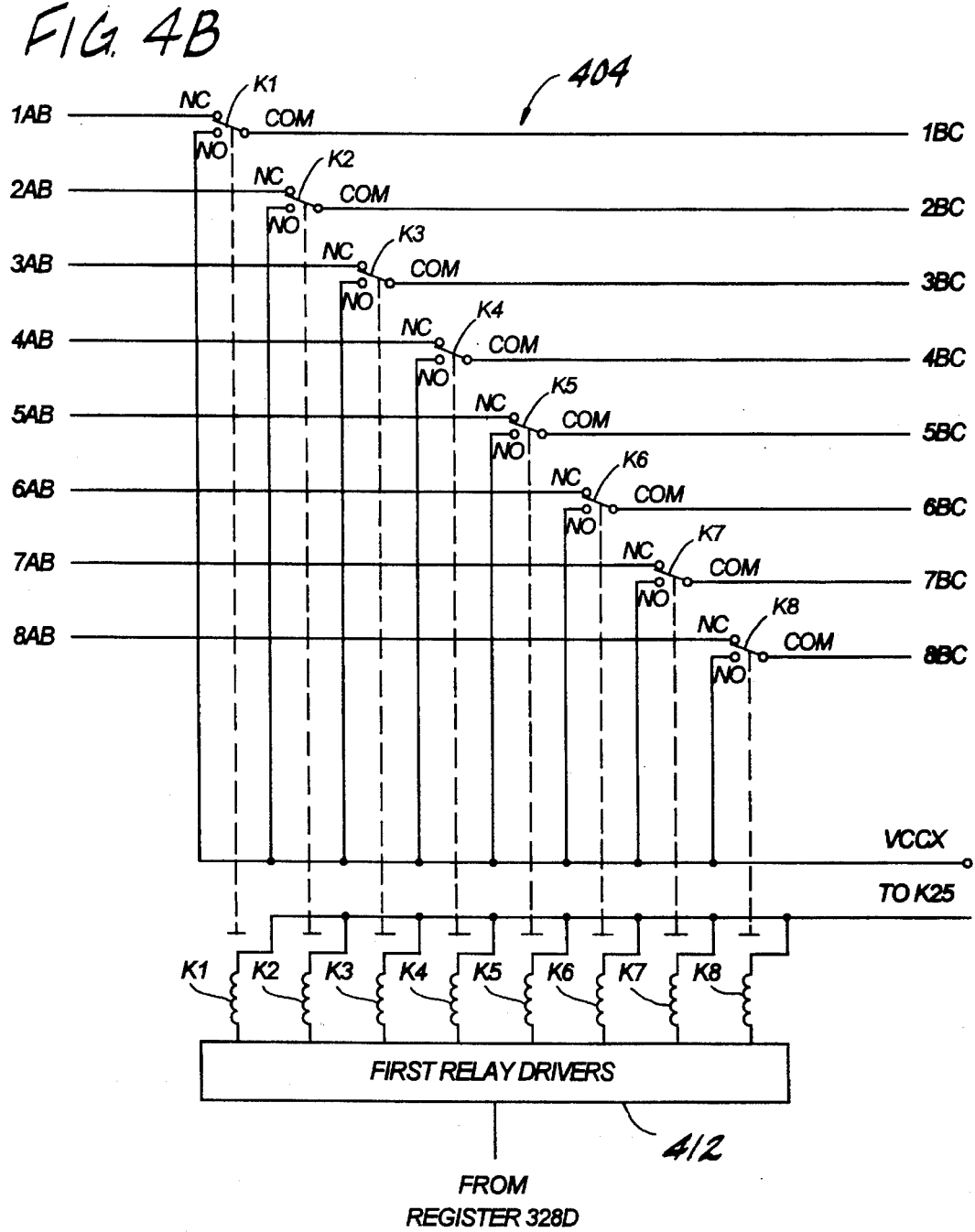
Figure 4C:
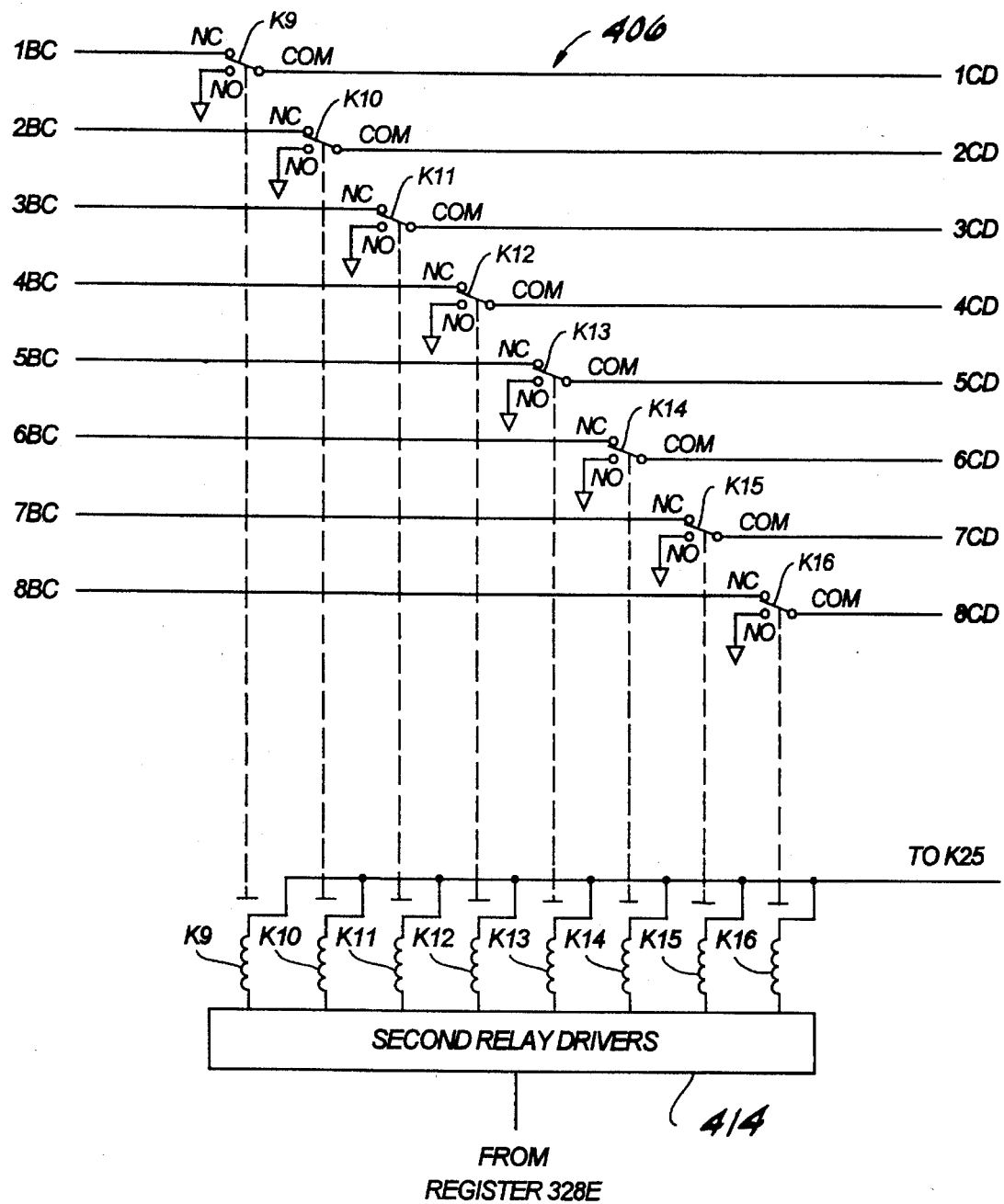

An output register 7001A provides the eight output ports which are to be supplied to the cellular telephone selected for programming via the RJ45 connector. An input register 7002B provides the eight input ports for transmitting data from the cellular telephone to the point-of-sale computer. FIGS. 4A, 4B, 4C, and 4D illustrate in more detail the connection between the input and output registers and the RJ45 connector. A first switched relay bank 404 (see FIG. 4B) includes eight switches K1–K8, each having an N.C. input connected via lines 1AB–8AB to one of pins 5–12 of connector P1 which connects to the output register 7001A (see FIG. 4). These N.C. inputs are also connected to one of pins 13–20 of connector P1 which connects to the input register 7002B (see FIG. 4). For example, input pin 5 and output pin 13 are connected to the input of switch K1. The first switched relay bank 404 has switches which are in their normally closed (N.C.) position in the deenergized mode and interconnect the registers with the inputs to a second switch relay bank 406. The N.O. (normally open) switched terminal of each of the switches K1–K8 of the first bank 404 is connected to a voltage supply VCCX provided by the programmable power supply 408 which will be discussed in greater detail below (see FIG. 5). If a switch in the first bank 404 is energized, this causes the switch to open circuit the input and output ports of the registers connected thereto and to connect voltage VCCX to the input of its corresponding switch in the second switch relay bank 406. As shown in FIG. 4A, polyfuses R10–R17 may be in line with switches K1–K8.

The second switched relay bank 406 (see FIG. 4C) includes eight switches K9–K16, each having an N.C. input connected via lines 1BC–8BC to the output of its corresponding switch of the first bank 404. In their deenergized state, the second switched relay bank 406 has switches which are normally closed and interconnect the output of the first bank 404 with an input to a third bank 410. The switched terminal of each of the switches K9–K16 of the second bank 406 is grounded. If a switch in the second bank 406 is energized, the output from its corresponding switch in the first bank is open-circuited and the output of the energized switch is grounded.

A third switched relay bank 410 (see FIG. 4D) has COM (common) inputs connected via lines 1CD–8CD to the outputs of the second bank 406 and outputs which are connected to the eight pins of the RJ45 modular connector 402. In their deenergized mode, switches K17–K24 of the third bank 410 are normally closed which open-circuits both the output of the second bank 406 and the inputs to RJ45. Upon energizing of one of the relay switches of third bank 410, the energized switch connects its input and output so that the pin of the RJ45 connector 402 is connected to the output of its corresponding switch in the second bank 406.

Register 328D controls a first bank of relay drivers 412 for selectively energizing coils controlling the position of switches K1–K8 to selectively move the switches of the first bank 404 to their normally open (NO) position. Similarly, register 328E controls a second bank of relay drivers 414 for selectively energizing coils controlling the position of switches K9–K16 to selectively move the switches of the second bank 406 to their normally open (NO) position. Register 328F controls a third set of relay drivers 416 for selectively energizing coils controlling the position of switches K17–K24 to selectively move the switches of the third bank 310 to their normally open (NO) position.

Each pin of RJ45 connector 402 can have one of four functions: power, data, inactive (open) or ground. Table 3 illustrates the status of the various switches of the banks in order to achieve one of these four functions.

TABLE 3

| Pin Type | Status of First Bank (K1–K8) | Status of Second Bank (K9–K16) | Status of Third Bank (K17–K24) |
|---|---|---|---|
| ground | off | on | on |
| power | on | off | on |
| data | off | off | on |
| open | off | off | off |

For example, suppose that a particular cellular telephone which has been selected for programming requires power on pin of RJ45 modular connector 402. This configuration information is provided to microprocessor 306 via the RS232 link with the point-of-sale computer 202. In response to this information, microprocessor 306 will provide data to the registers 328 to implement pin 1 of RJ45 as the power pin. Specifically, the coil of switch K1 will be energized causing its output to be connected to VCCX, the coil of switch K9 will not be energized so that its input is connected to its output and the coil of switch K17 will be energized causing its input to be connected to its output so that pin 1 of RJ45 connector 402 is supplied with voltage VCCX via switch K1. As a further example, suppose that pin 3 of RJ45 carries data. Once again, microprocessor 306 would be programmed with configuration information defining pin 3 of RJ45 as the data pin. As a result, registers 328 would be provided with data causing the coil of switch K3 to be deenergized so that its input is connected to its output, causing the coil of switch K11 to be deenergized causing its input to be connected to its output and causing the coil of switch K19 to be energized causing its input connected to its output so that pin 3 would be connected to pin 7 of connector P1 for input and would be connected to pin 15 of connector P1 for output of data. In the event that a pin of RJ45 is not being used, none of the coils of its corresponding switches are energized which results in the switch of the third bank open-circuiting the pin and open-circuiting the input and output ports corresponding thereto.

Figure 5:
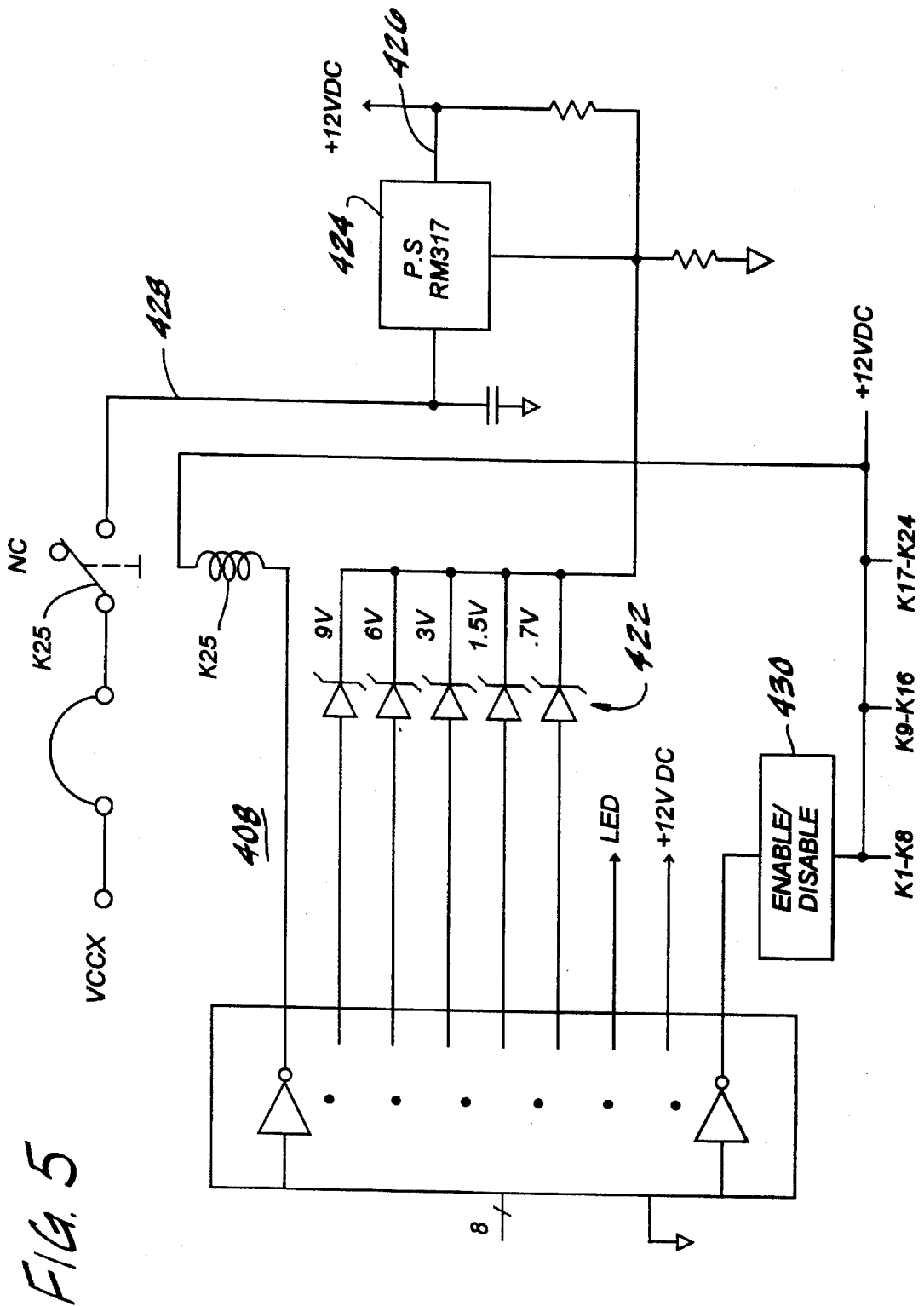
FIG. 5 is a partial schematic diagram of the programmable power supply of the relay board of the cellular telephone interface according to the invention.

The magnitude of voltage VCCX provided to the switched terminal of the first bank 404 is controlled by programmable power supply 408 shown in FIG. 5. Supply 408 includes an array of drivers 420 each driven by one of the outputs of register 328C. Depending on the magnitude of the voltage required by the selected cellular telephone to be programmed, microprocessor 306 actuates the particular driver of bank 420 to provide a signal via its zener diode 422 to programmable supply 424. This impresses a voltage on input 426 of programmable supply 424 so that its output 428 corresponds to the desired voltage. Additionally, one of the drivers of bank 420 may control an enable/disable circuit 430 and coil K25 of switch K25 for controlling the energization of coils K1–K24 allowing these coils to be selectively energized and de-energized to minimize excessive switching during interface operation and allowing coil K25 to be energized to connect VCCX to the +12 VDC bus which drives coils K1–K24.

As part of the configuration information that is provided to microprocessor 306, the pins of the RJ45 connector which must send or receive data are also identified. As a result, microprocessor 306 employs the address PROM 320 and address buffer 322 so that the data supplied to the selected cellular telephone is latched from memory to the appropriate register and carried through the appropriate switches to the data pin of the RJ45 connector requiring it. In general, the microprocessor 306 rotates the data information within the registers 328 so that the particular data word is in the form required by the selected cellular telephone and is clocked out of the register in the required order. For selected cellular telephones which operate at higher baud rates, it may be necessary to employ a general purpose high-speed shift register in place of or in series with registers 328.

In operation, the system functions as follows. Through the multi-media presentation, a customer selects a cellular telephone for purchase according to the telephones that are in inventory and the perceived needs of the customer. Using the input to the point-of-sale computer, an operator or clerk inputs customer information which is provided to the RPSC. The operator also identifies the particular make and model of the selected telephone to be programmed. The POS program then accesses the database to select the particular command and data information needed by the selected telephone, to determine the configuration of the selected telephone and to select the particular microcode translator needed to translate into the protocol required by the telephone. This information is transmitted via the I/O port into the microprocessor of the interface. The microprocessor then sets various banks of switches according to the need and configuration of the selected telephone. Next, the NAM of the cellular telephone is programmed and read to determine the serial number of the phone. Eventually, this serial number information is provided to the RPSC and CT COMMNET to be matched up with the personal information of the customer for billing purposes. The parameters loaded into the NAM are then read back to verify their accuracy. If the selected telephone is properly programmed, the operation of the system is complete and the customer may take the phone and immediately use it.

Three types of information are provided during this process from the POS computer to the microprocessor of the interface. First, ASCII variables that actually program the telephone are provided in the form of command and data information. Second, variables that describe the physical configuration of the programming port on the selected telephone including pin assignments, baud rate, and voltages are transferred. Third, microcode that performs the translation from the ASCII variables to the arbitrary phones' specific protocol are also provided to the microprocessor.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A CTI PROGRAM DESCRIPTION

Three canonical classes of programs have been implemented for the CTI:
1. Programs to send and receive data from the 'phone.
2. Programs to load the operating programs into the CTI.
3. Programs to load the programs that perform the first items.

The programs in the CTI are written partly in interpretive Basic and partly in Assembly Language.
1. Communication between the CTI and the 'phone.

This family of programs is characterized by a fixed structure into which different members of the family are set. Normally 'phones respond to signals on one pin of the Telephone Interface and send signals on another. As the content and meaning of the signals vary between 'phones, the programs to supply these signals also varies. The structure of this set of programs remains constant and is clearly defined by the CTI flow diagram:

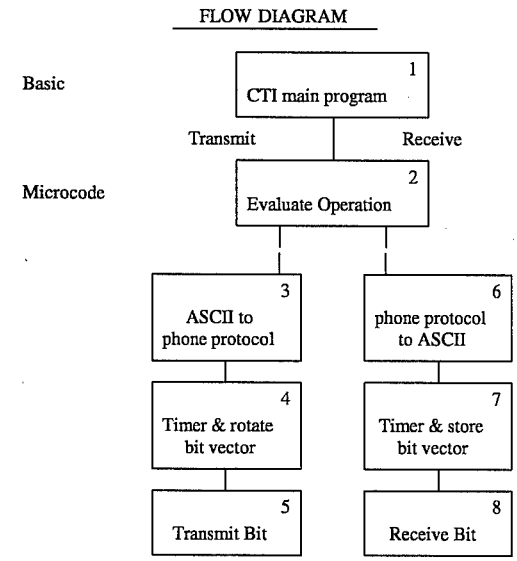

FLOW DIAGRAM

Each block in the flow diagram has a specific objective and is implemented by a program. Each of the above blocks represent a function. The functions in the CTI system remain fixed regardless of the make or model phone being programed. The content of the programs will vary widely. Thus the function "Transmit Bit" will always be present, regardless of the make or model of the phone. It may, of course, be very different if the electrical characteristics of two phones are dissimilar.

The program titled "CTI main program" is programmed in Basic and will not change regardless of the type of phone being programmed. It places the variables that describe the phone in their assigned locations in memory and passes the parameters between the PC and the CTI subprograms. The program is loaded into permanent memory and remains in position until changed by the programming system designed for this purpose.

Each of this set of programs in will be described first functionally then procedurally; first what they are doing, then how they are doing it.

a. Functional descriptions.

The functional definition will be in psudomathematical form. The notational conventions followed are identical to those of contemporary mathematics; lower case—scalars; the letters i through n denote integers, the remaining letters denote real numbers; upper case—arrays or vectors.

Each subprogram will be described in terms of a mapping function, i.e. x=f (y). To distinguish between functions will be numbered: x=f{5} (Q,w). The braces { } denote the function, and corresponds to the numbers in FIG. 6. (Braces substituted for more familiar subscript.)

The variable(s) to the left of the equal sign are the results of the function, the variable to the right denote the input to the function.

| | | |
|---|---|---|
| V', W, U = f{1} V, W | | Passes the data and the 'phone properties vector to the remainder of the subprograms and passes results to the PC. |
| | Where: | V - the input string. |
| | | W - properties vector. |
| | | U - results vector |
| | Calls: | f{2} |
| | Returns: | not applicable |
| x = f{2} (V, o) | | Evaluates the operation. |
| | Where: | x - dummy variable |
| | | V - input string |
| | | o - the operation (r/w). |
| | Calls: | f{6} if o = "r" |
| | | f{3} if o = "w" |
| | | nothing otherwise |
| | Returns: | 0 if performed |
| | | 1 otherwise |
| R = f{3} (C, ic) Converts a character from ASCII form to the required protocol. Timer interrupt is disabled upon entry. Deposits the formatted character in the bit vector. | | |
| | Where: | R - the character in the required protocol. |
| | | C - the character in ASCII |
| | | ic - the index of the ASCII parameter. |
| | Calls | f{4} |
| | Returns: | nothing |
| R' = f{4} (R, M(t))) Activated the timer. Samples the timer output. Rotates the bit vector the required number of times. | | |
| | Where: | R - the bit vector on entry to the subroutine |
| | | R' is the rotated bit vector. |
| | | M(t) - the transmit mask or format for transmission. |
| | Calls | f{5} |
| | Returns: | 0 if performed |
| | | 1 otherwise |
| e, d = f{5} (R, M(t)) When invoked, places the low order bit of the bit vector in the output port. | | |
| | Where: | e - the voltage on the port |
| | | d - duration between samples |
| | | R - is the shifted bit vector in manufacture's protocol. |
| | | M(t) - Transmit mask. |
| | Calls | none |
| | Returns | nothing |
| C(ic) = f{6} (R, ic) Timer is disabled. An ASCII character is placed in the character vector in position ic. The character will be the conversion of the bits received from the phone into ASCII. | | |
| | Where: | C(ic) - element of string |
| | | R - the bit vector received. |
| | | ic - the index of the character. |
| | Returns: | 0 if performed |
| | | 1 otherwise |
| R = f{7} (b, ib) Creates a vector of bits received. | | |
| | Where: | b - the bit received. |
| | | ib - the index of the bit. |
| | | R - the bit vector. |
| | Calls | f{8} |
| | Returns: | nothing. |
| b = f{8} (e, d, M(r)) When invoked sets the bit value to one or zero when the voltage on the port is sampled. | | |
| | Where: | e - the voltage on the port |
| | | d - duration between samples |
| | | b - is the shifted bit vector in manufacture's protocol. |
| | | M(r) - the receive mask or format for reception. |
| | Calls | none |
| | Returns | nothing |

Every phone must have all of the above functions performed in one form or another. Note that f{5}, the transmit function, may transmit the signals on a single line using RS232 protocol or a single line using a different protocol or on more than a single line. Regardless of how the signals are sent, this function must be performed. Most phones will send the signal in RS232 protocol. All phones that do so will use a single version of function f{5} to place signal voltages on the output lines.

b. Procedural descriptions.

One of the most important aspects of programming this type of system is keeping the addresses of the variables fixed and known to each program. This problem is easily solved using the EQU and the INCL pseudo operations available in the assembly program.

The addresses of the variables, described below, are all coded in one block consisting exclusively of EQU statements. This block is included in each assembly language routine. There are no procedural actions in this subprogram. See program listings, Appendix B.

The characteristics of the phone that are variables to the system are all sent to the CTI in the INTEL standard format. This format permits these data variables to be bundled into the same group of records that send the phone sensitive subroutines.

All data are sent to the CTI in one format.

ppllaaa . . . a

Where:

pp-the operation, in hex (see above).

ll-the length of the parameter in hex.

aa-the parameter of length ll, each pair aa is a hexadecimal coding of the ASCII character.

Summarizing the programming strategy; (1) all variables are kept in memory and in fixed locations, (2) all data is embodied in only two forms.

Flow diagram for Function 1, CTI main routine.

```
        Enter
          │
          ▼
  ┌──────────────────┐
  │ Configure ports  │
  └──────────────────┘
          │
     ┌────▼─────────────┐
     │ Fetch parameter  │◄──┐
     └──────────────────┘   │
          │                 │
          ▼                 │
  ┌──────────────────────┐  │
  │ Convert hex parameters│ │
  │ to integer numbers   │  │
  └──────────────────────┘  │
          │                 │
          ▼                 │
  ┌──────────────────────┐  │
  │ Place the parameter in│ │
  │ output buffer call f{2}│─┘
  └──────────────────────┘
          │
        Return
```

Flow diagram for Function 2, Write/Read or Read.

-continued

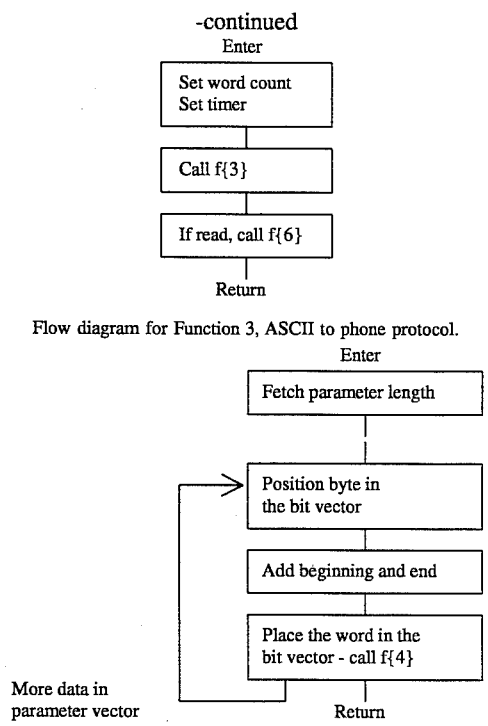

Flow diagram for Function 3, ASCII to phone protocol.

Flow diagram for Function 4, Timer & rotate bit vector.

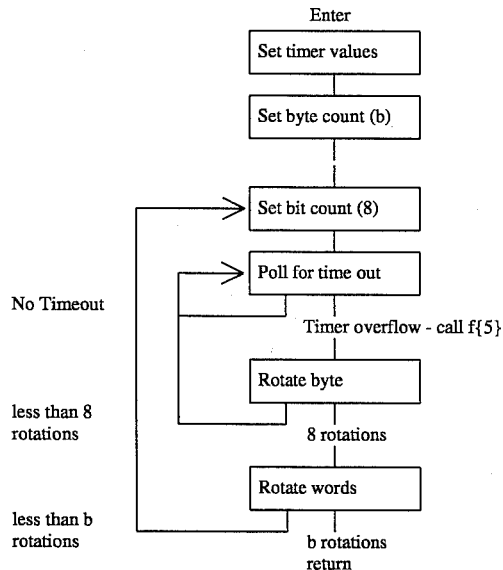

Flow diagram for Function 5, Transmit.

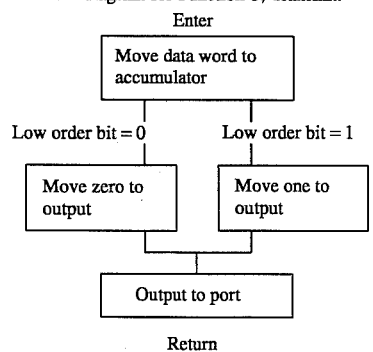

Flow diagram for Function 6, Phone protocol to ASCII.

-continued

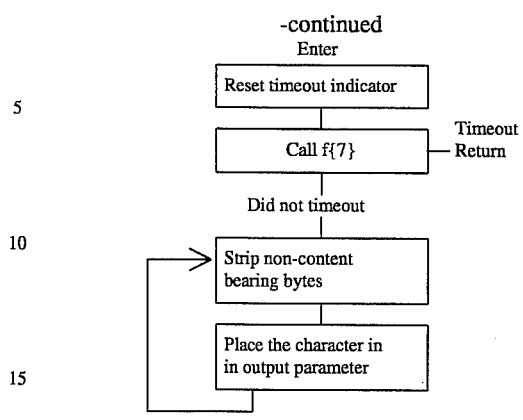

Flow diagram for Function 7, Timer & store bits

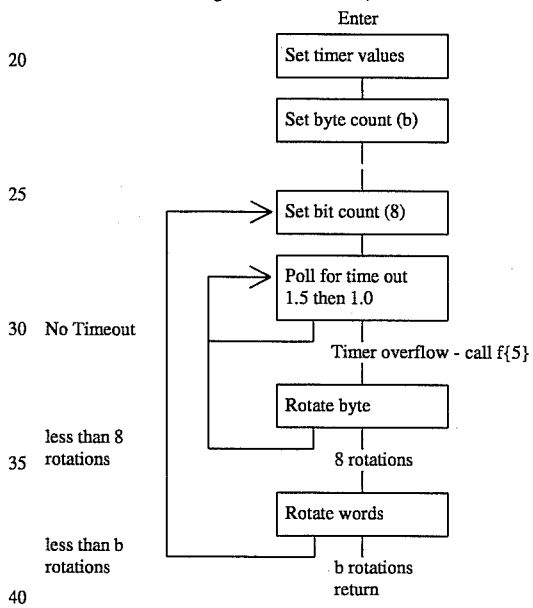

Flow diagram for Function 8, Receive bit.

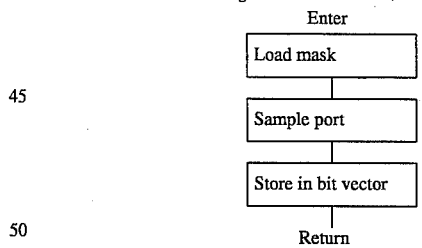

2. Loader program.

In order for the CTI to program an arbitrary 'phone, it must be able to provide signals to the 'phone at any rate, in any character set and in any protocol that can be devised in the mind of man. The programs, discussed above, provide this capability. Whenever a 'phone is programmed, the program set that conditions the CTI to mimic the 'phone's programming environment is loaded into the CTI. The program that loads these programs is derived from INTEL's program loader. It differs in two ways. (1) Only two error messages are produced, "Phone not connected" and "Program in error". (2) The CTI single-shot is bumped after each record is processed.

3. EEPROM maintenance.

Four programs are required to maintain the CTI system.
1. EEPROM erase—completely clears EEPROM.

2. CTI reset—resets the CTI after the single-shot times out.
3. Program loader—load the Basic programs that reside in EEPROM. This program is part of the support programs in the PC.

What is claimed is:

1. A system for point-of-sale programming a selected one of a plurality of types and models of cellular telephones, each type or model of telephone requiring programming by a specific set of command signals for controlling the telephone and a specific set of data signals to be stored in the telephone including data defining a telephone number to be assigned to the telephone, said data signals for programming the telephone for operation as part of a cellular telephone system, each telephone having a programming port through which data may be transferred by data signals and through which the telephone may be controlled by command signals, said system comprising:

a point-of-sale computer having an I/O port and including:
a database storing sets of command information and data information including the assigned telephone number, each set for programming a particular one of the plurality of cellular telephones;
means for identifying the particular set of command and data information in the database required for programming the selected cellular telephone; and
interface driver software for sending information via the I/O port corresponding to the particular set of command and data information;

interface means connected to the I/O port and having a telephone interface port, for sending via the telephone interface port the specific set of command signals and data signals corresponding to the information provided by the computer via the I/O port; and means for providing the specific set of command signals and data signals to the programming port of the selected cellular telephone via the telephone interface port thereby providing the specific set of command signals and data signals via the programming port to the selected cellular telephone for programming it with the assigned telephone number.

2. The system of claim 1 wherein the I/O port comprises a RS232 standard interface.

3. The system of claim 1 wherein the programming port of the cellular telephone comprises an RJ45 port and the I/O port comprises an RS232 port.

4. The system of claim 1 wherein the database includes configuration information and wherein the computer sends via the I/O port the configuration information corresponding to the configuration of the selected telephone to be programmed, and wherein the interface means comprises a microprocessor having an input connected to the I/O port and having an output for generating the command signals and data signals, said microprocessor also having an output for generating control signals corresponding to the configuration information.

5. The system of claim 4 wherein the programming port includes a number of terminals and wherein the interface means comprises;
an array of buffers for temporarily storing the command signals, the data signals and the control signals;
an array of switches connected between the array of buffers and the terminals; and
means, responsive to the control signals, for controlling positions of the switches so that the command signals are supplied to their corresponding terminal and the data signals are supplied to their corresponding terminal.

6. The system of claim 1 wherein the interface means includes a programmable power supply controlled by the microprocessor in response to the configuration information and connected to the power input port of the selected cellular telephone.

7. A system for point-of-sale programming a selected one of a plurality of types and models of cellular telephones, each type or model of telephone requiring programming by a specific set of command signals for controlling the telephone and a specific set of data signals to be stored in the telephone including data defining a telephone number to be assigned to the telephone, said data signals for programming the telephone for operation as part of a cellular telephone system, each telephone having a programming port through which data may be transferred by data signals and through which the telephone may be controlled by command signals, said system comprising:

a point-of-sale computer having an I/O port sending command information and data information including the assigned telephone number, said information corresponding to the specific set of command signals and data signals required for the selected telephone to be programmed;

an interface converting the information into the specific set of command signals and data signals required for the selected telephone to be programmed, said interface having a telephone interface port through which the specific set of command signals and data signals are provided;

means for connecting the I/O port of the computer and the interface thereby providing the information to the interface; and means for connecting the telephone interface port of the interface and the programming port of the selected cellular telephone thereby providing the specific set of command signals and data signals via the programming port to the selected cellular telephone for programming it with the assigned telephone number.

8. The system of claim 7 wherein the I/O port comprises a RS232 standard interface.

9. The system of claim 7 wherein the programming port of the cellular telephone comprises an RJ45 port and the I/O port comprises an RS232 port.

10. The system of claim 7 wherein the computer sends via the I/O port configuration information corresponding to the configuration of the selected telephone to be programmed, and wherein the interface means comprises a microprocessor having an input connected to the I/O port and having an output for generating the command signals and data signals, said microprocessor also having an output for generating switch control signals corresponding to the configuration information.

11. The system of claim 10 wherein the programming port includes a number of terminals and wherein the interface means comprises;
an array of buffers for temporarily storing the command signals, the data signals and the switch control signals;
an array of switches connected between the array of buffers and the terminals; and
means, responsive to the switch control signals, for controlling positions of the switches so that the command signals are supplied to their corresponding terminal and the data signals are supplied to their corresponding terminal.

12. The system of claim 7 wherein the interface means includes a programmable power supply controlled by the microprocessor in response to the configuration information and connected to the power input port of the selected cellular telephone.

13. A system for point-of-sale programming a selected one of a plurality of types and models of cellular telephones, each type or model of telephone requiring programming by a specific set of command signals for controlling the telephone and a specific set of data signals to be stored in the telephone including data defining a telephone number to be assigned to the telephone, said data signals for programming the telephone for operation as part of a cellular telephone system, each telephone having a battery compartment including a power input port for engaging a battery within the compartment for supplying electrical power to the telephone, and each telephone having a programming port in the compartment through which the telephone may be programmed, said system comprising:

point-of-sale computer means for sending information corresponding to the specific set of command signals and data signals for the selected telephone to be programmed;

interface means, connected to the computer means and having a telephone interface port, for converting the information provided by the computer means into the specific set of command signals and data signals required for the selected telephone to be programmed, said data signals including signals corresponding to the assigned telephone number, said interface means providing the specific set of command signals and data signals via the telephone interface port, said interface means including a power output port for supplying power for the selected telephone to be programmed; and adapter means engaging the battery compartment for connecting the telephone interface port of the interface means to the programming port of the selected telephone to supply the specific set of command signals and data signals to the selected telephone to program it with the assigned telephone number, said adapter means also connecting the power output port of the interface means to the power input port to supply power to the selected telephone to power it during programming.

14. The system of claim 13 wherein the I/O port comprises a RS232 standard interface.

15. The system of claim 13 wherein the programming port of the cellular telephone comprises an RJ45 port and the I/O port comprises an RS232 port.

16. The system of claim 13 wherein the computer sends via the I/O port configuration information corresponding to the configuration of the selected telephone to be programmed, and wherein the interface means comprises a microprocessor having an input connected to the I/O port and having an output for generating the command signals and data signals, said microprocessor also having an output for generating switch control signals corresponding to the configuration information.

17. The system of claim 16 wherein the programming port includes a number of terminals and wherein the interface means comprises;

an array of buffers for temporarily storing the command signals, the data signals and the switch control signals;

an array of switches connected between the array of buffers and the terminals; and means, responsive to the switch control signals, for controlling positions of the switches so that the command signals are supplied to their corresponding terminal and the data signals are supplied to their corresponding terminal.

18. The system of claim 13 wherein the interface means includes a programmable power supply controlled by the microprocessor in response to the configuration information and connected to the power input port of the selected cellular telephone.

19. A point-of-sale programming system for a selected one of a plurality of types and models of cellular telephone, each having a preassigned serial number and a programming port through which data may be transferred by data signals and through which the telephone may be controlled by control signals, each type or model of telephone requiring programming by a specific set of command signals for controlling the telephone and a specific set of data signals to be stored in the telephone including data defining a telephone number to be assigned to the telephone, said data signals for programming the telephone for operation, each telephone to be operated as part of a cellular telephone (CT) communicating network system having a system computer which controls the CT system operation and verifies that the cellular telephone can access the CT system through a repeater, said system comprising:

a point-of-sale computer having an I/O port generating command information and data information including the assigned telephone number, said information corresponding to the specific set of command signals and data signals required for the selected telephone to be programmed and for reading the preassigned serial number of the telephone;

an interface converting the information into the specific set of command and data signals required for the selected telephone to be programmed, said interface having a telephone interface port through which the specific set of command signals and data signals are provided, said interface reading the preassigned serial number via the telephone interface port;

means for connecting the I/O port of the computer and the interface thereby transmitting the information to the interface and the preassigned serial number to the computer;

means for connecting the telephone interface port of the interface and the programming port of the selected cellular telephone thereby providing the specific set of command signals and data signals via the programming port to the selected cellular telephone and providing the preassigned serial number to the computer via the interface; and means for linking the computer and the system computer of the CT system so that the computer provides the system computer with the preassigned serial number of the selected cellular telephone being programmed thereby permitting the system computer to verify that the selected telephone can access the CT system.

20. A point-of-sale programming system for a selected one of a plurality of types and models of cellular telephone, each a preassigned serial number and a programming port through which data may be transferred by data signals and through which the telephone may be controlled by control signals, each type or model of telephone requiring programming by a specific set of command signals for controlling the telephone and a specific set of data signals to be stored in the telephone including data defining a telephone number to be assigned to the telephone, said data signals for programming the telephone for operation, each telephone to be operated as part of a cellular telephone (CT) communication network system having a system computer which controls the CT system operation and verifies that the cellular telephone can access the CT system through a repeater, said system comprising:

means having a port for generating the specific set of command signals and data signals required for the selected telephone to be programmed and for reading the preassigned serial number of the selected telephone;

means for connecting the port of the means and the cellular telephone thereby transmitting the specific set of command and data signals to the cellular telephone and transmitting the preassigned serial number to the means; and means for linking the means and the system computer of the CT system so that the means provides the system computer with the preassigned serial number of the selected cellular telephone being programmed thereby permitting the system computer to verify that the selected telephone can access the CT system.

21. The system of claim 20 comprising a computer having an RS232 I/O port generating command and data information corresponding to the specific set of command signals and data signals required for the selected telephone to be programmed and for reading the preassigned serial number of the telephone;

an interface converting the information into the specific set of command and data signals required for the selected telephone to be programmed, said interface having a telephone interface port through which the specific set of command signals and data signals are provided, said interface reading the preassigned serial number via the telephone interface port;

means for connecting the I/O port of the computer and the interface thereby transmitting the information to the interface and the preassigned serial number to the computer;

means for connecting the telephone interface port of the interface and the programming port of the selected cellular telephone thereby providing the specific set of command signals and data signals via the programming port to the selected cellular telephone and providing the preassigned serial number to the computer via the interface; and means for linking the computer and the system computer of the CT system so that the computer provides the system computer with the preassigned serial number of the selected cellular telephone being programmed thereby permitting the system computer to verify that the selected telephone can access the CT system.

22. The system of claim 20 further comprising means for storing multimedia information to assist the operator in the operation of the system and to assist a customer in the use, selection and purchase of a cellular telephone.

23. A method for point-of-sale programming a selected one of a plurality of types and models of cellular telephones, each type or model of telephone requiring programming by a specific set of command signals for controlling the telephone and a specific set of data signals to be stored in the telephone including data defining a telephone number to be assigned to the telephone, said data signals for programming the telephone for operation as part of a cellular telephone system, each telephone having a programming port through which data may be transferred by data signals and through which the telephone may be controlled by command signals, said method comprising the steps of:

identifying the particular set of command and data information required for programming the selected telephone;

sending information via an I/O port of a computer corresponding to the particular set of command information and data information including the assigned telephone number;

sending the specific set of command signals and data signals via a telephone interface port of an interface corresponding to the information provided by the computer via the I/O port; and providing the specific set of command signals and data signals via the programming port to the particular telephone for programming it with the assigned telephone number.

24. A method of point-of-sale programming a selected one of a plurality of types and models of cellular telephones, each type or model of telephone requiring programming by a specific set of command signals for controlling the telephone and a specific set of data signals to be stored in the telephone including data defining a telephone number to be assigned to the telephone, said data signals for programming the telephone for operation as part of a cellular telephone system, each telephone having a programming port through which data may be transferred by data signals and through which the telephone may be controlled by command signals, said method comprising the steps of:

sending via an I/O port information having command information and data information including the assigned telephone number, said information corresponding to the specific set of command signals and data signals required for the selected telephone to be programmed;

connecting the telephone interface port of the interface and the programming port of the selected cellular telephone to provide the specific set of command signals and data signals via the programming port to the selected cellular telephone for programming it with the assigned telephone number;

converting the information into the specific set of command signals and data signals required for the selected telephone to be programmed; and providing to the cellular telephone via a telephone interface port the specific set of command signals and data signals converted from the information.

25. A method of point-of-sale programming a selected one of a plurality of types and models of cellular telephones, each type or model of telephone requiring programing by a specific set of command signals for controlling the telephone and a specific set of data signals to be stored in the telephone including data defining a telephone number to be assigned to the telephone, said data signals for programming the telephone operation as part of a cellular telephone system, each telephone having a battery compartment including a power input port for engaging a battery within the compartment for supplying electrical power to the telephone, and each telephone having a programming port in the compartment through which the telephone may be programmed, said method comprising the steps of:

sending information corresponding to the specific set of command signals and data signals for the selected telephone to be programmed;

converting the information into the specific set of command signals and data signals required for the selected telephone to be programmed, said data signals including signals corresponding to the assigned telephone number;

providing the specific set of command signals and data signals via a telephone interface port;

supplying power via a power output port to the selected cellular telephone to be programmed; and engaging an adapter means with the battery compartment for connecting the telephone interface port to the programming port of the selected telephone to supply the specific set of command signals and data signals to the selected cellular telephone to program it with the assigned telephone number, said adapter means also connecting the power output port to the power input port to supply power to the selected telephone to power it during programming.

26. A point-of-sale programming method for a selected one of a plurality of types and models of cellular telephone, each having a preassigned serial number and a programming port through which data may be transferred by data signals and through which the telephone may be controlled by control signals, each type or model of telephone requiring programming by a specific set of command signals for controlling the telephone and a specific set of data signals to be stored in the telephone including data defining a telephone number to be assigned to the telephone, said data signals for programming the telephone for operation, each telephone to be operated as part of a cellular telephone (CT) system having a system computer which controls the CT system operation and verifies that the cellular telephone can access the CT system through a repeater, said method comprising the steps of:

providing from a means to the programming port the specific set of command signals and data signals required for the selected telephone to be programmed;

reading by the means via the programming port the preassigned serial number of the selected telephone;

linking the means and the system computer of the CT system; and providing from the means to the system computer the preassigned serial number of the selected cellular telephone being programmed thereby permitting the system computer to verify that the selected telephone can access the CT system.

27. An interface for point-of-sale programming a selected one of a plurality of types and models of devices, each type or model of device requiring programming by a specific set of command signals for controlling the device and a specific set of data signals to be stored in the device, said data signals for programming the device for operation, each device having a programming port through which data may be transferred by data signals and through which the device may be controlled by command signals, said interface for use with a system comprising: a point-of-sale computer having an I/O port and including: a database storing sets of command and data information, each set for programming a particular one of the plurality of devices; means for identifying the particular set of command and data information in the database required for programming the selected device; and interface driver software for sending information via the I/O port corresponding to the particular set of command and data information; said interface comprising:

means connected to the I/O port and having a device interface port for sending via the device interface port the specific set of command signals and data signals corresponding to the information provided by the computer via the I/O port; and means for providing the specific set of command signals and data signals to the programming port of the selected device via the device interface port thereby providing the specific set of command signals and data signals via the programming port to the selected device for programming it.

28. An interface for a system for point-of-sale programming a selected one of a plurality of types and models of cellular telephones, each type or model of telephone requiring programming by a specific set of command signals for controlling the telephone and a specific set of data signals to be stored in the telephone including data defining a telephone number to be assigned to the telephone, said data signals for programming the telephone for operation as part of a cellular telephone system, each telephone having a programming port through which data may be transferred by data signals and through which the telephone may be controlled by command signals, said system including a computer having an I/O port sending command and data information corresponding to the specific set of command signals and data signals required for the selected telephone to be programmed, said interface comprising:

means for converting the information into the specific set of command signals and data signals required for the selected device to be programmed, said data signals including signals corresponding to the assigned telephone number, said interface having a device interface port through which the specific set of command signals and data signals are provided;

means for connecting the I/O port of the computer and the interface thereby providing the information to the interface; and means for connecting the device interface port of the interface and the programming port of the selected device thereby providing the specific set of command signals and data signals via the programming port to the selected device for programming it with the assigned telephone number.

29. In a system for point-of-sale programming a selected one of a plurality of types and models of devices, each type or model of device requiring programming by point-of-sale a specific set of command signals for controlling the device and a specific set of data signals to be stored in the device, said data signals for programming the device for operation as part of a device system, each device having a battery compartment including a power input port for engaging a battery within the compartment for supplying electrical power to the device, and each device having a programming port in the compartment through which the device may be programmed, said system having computer means for sending information corresponding to the specific set of command signals and data signals for the selected device to be programmed; a point-of-sale interface comprising:

means, connected to the computer means and having a device interface port, for converting the information provided by the computer means into the specific set of command signals and data signals required for the selected device to be programmed, said converting means providing the specific set of command signals and data signals via the device interface port, said converting means including a power output port for supplying power for the selected device to be programmed; and adapter means engaging the battery compartment for connecting the device interface port of the converting means to the programming port of the selected device to supply the specific set of command signals and data signals to the selected device to program it, said adapter means also connecting the power output port of the converting means to the power input port to supply power to the selected device to power it during programming.

30. The system of claim 1 wherein the database includes microcode translator information for translating the command and data information into command and data signals, and wherein the computer sends via the I/O port the microcode translator information, and wherein the interface means comprises a microprocessor executing the microcode translator and having an input connected to the I/O port and having an output for generating the command signals and the data signals corresponding to the command and data information.

31. The system of claim 4 wherein the database includes procedural information which implements the translated command and data information and converts it into command and data signals according to the configuration information.

32. The system of claim 31 wherein the procedural information specifies one or more of the following with respect to the command and data signals to be provided to the cellular telephone: signal voltage, signal power, and signal data rate.

33. The system of claim 1 wherein the database includes configuration information defining the pin assignments and/or impedances required by the cellular telephone, and wherein the computer sends to the interface means via the I/O port the configuration information, and wherein the interface means comprises a microprocessor for executing the configuration information and having an output for generating control signals corresponding to the configuration information whereby the interface means generates command and data signals according to the required pin assignments and impedances.

34. The system of claim 1 wherein the database includes configuration information for reading variables in the cellular telephone, and wherein the computer sends to the interface means via the I/O port the configuration information, and wherein the interface means comprises a microprocessor executing the configuration information to read the variables stored in the cellular telephone.

* * * * *